Feb. 18, 1964 C. F. NEWBURG 3,121,679
METHOD OF OPERATING SCREENS
Filed May 27, 1958 2 Sheets-Sheet 2

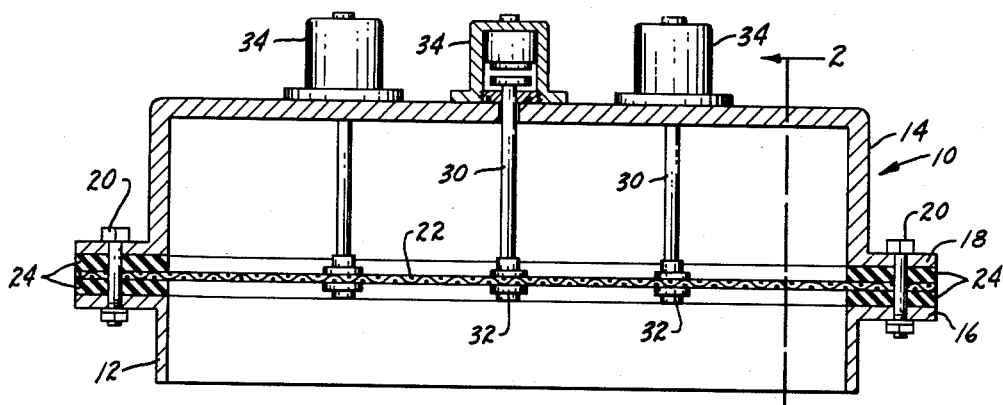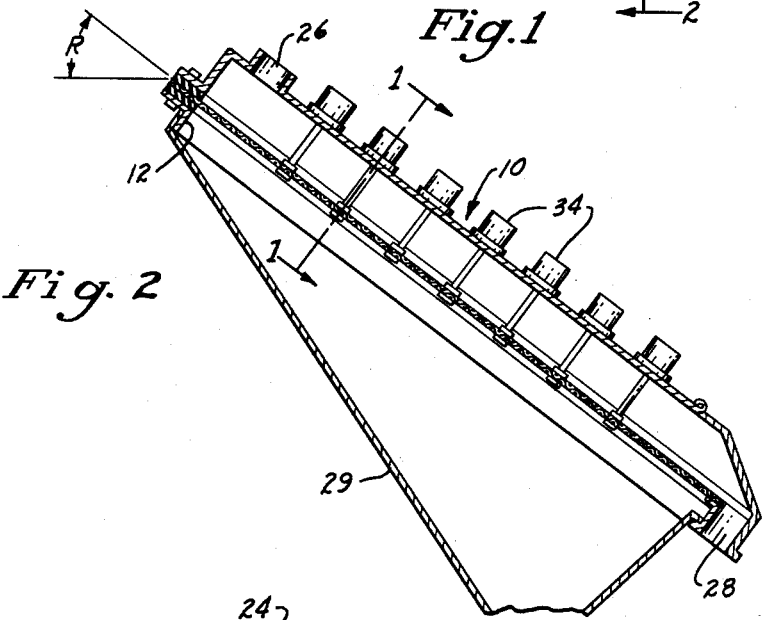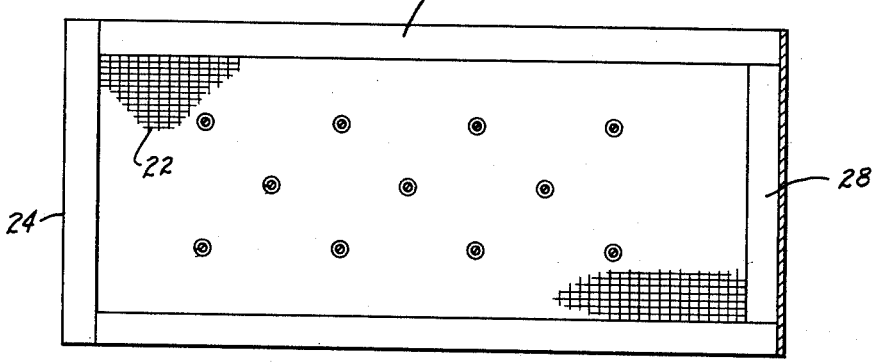

INVENTOR.
CHARLES F. NEWBURG,
BY
Parker and Carter
ATTORNEYS

United States Patent Office 3,121,679
Patented Feb. 18, 1964

3,121,679
METHOD OF OPERATING SCREENS
Charles F. Newburg, Chicago, Ill., assignor to Novo Industrial Corporation, a corporation of New York
Filed May 27, 1958, Ser. No. 738,182
5 Claims. (Cl. 209—233)

This invention is in the field of screening or separating material and is concerned with a new and improved method of operating a vibratory screen to increase its efficiency for any particular material according to a desired particle size separation.

A primary object of the invention is a new and improved screening method which requires a minimum of adjustment.

Another object is a method of operating a known vibratory screen for peak efficiency with any particular material to be screened.

Another object is a method of increasing the separation efficiency of a screen or sifter without extensive controls.

Another object is a method of operating a screening device in accordance with a controlling characteristic of the particular material to be screened.

Another object is a method of operating or adjusting a screen so as to obtain the maximum efficiency for any particular material.

Another object is a method of screening or separating dry material without blinding or clogging.

Figure 5:
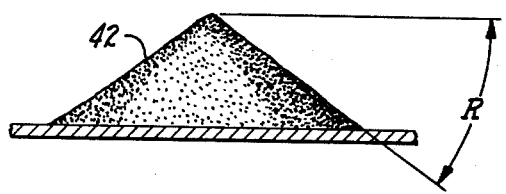
Figure 4:
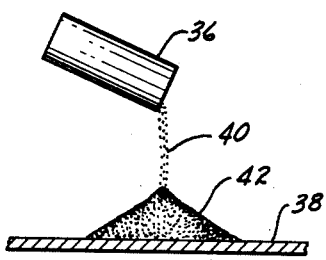
Figure 6:
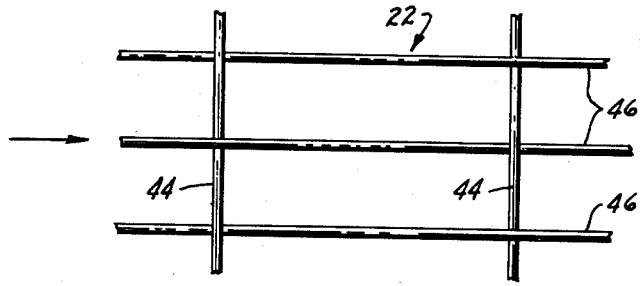
Figure 7:
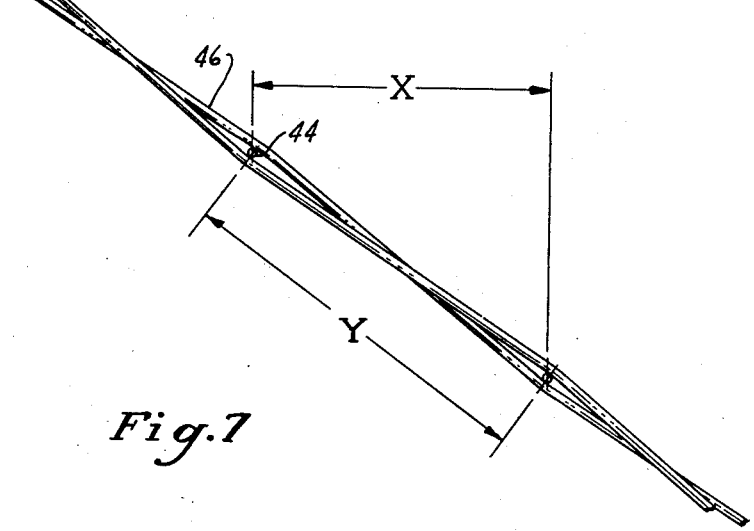

Other objects will appear from time to time in the ensuing specification and drawings in which:

FIGURE 1 is a section along line 1—1 of FIGURE 2;
FIGURE 2 is a section along line 2—2 of FIGURE 1;
FIGURE 3 is a plan view of the screen deck with the superstructure removed;
FIGURE 4 is a diagrammatic representation of one step that may be used in the method;
FIGURE 5 is a schematic view of one step in operating the screen;
FIGURE 6 is a plan view, on an enlarged scale, of a portion of the screen deck; and
FIGURE 7 is a side view of the portion of the screen deck shown in FIGURE 6.

In FIGURES 1, 2 and 3 the screen device is shown as including a frame, indicated generally at 10, made up of but not limited to a base 12 with a bridging member 14, both of which may have outstanding flanges as at 16 and 18 to be secured together by bolts 20 or the like. A screening medium or screening element or mesh 22 is disposed across the frame and held between the flanges by rubber or felt pads 24. As shown in FIGURE 2, the bridging member 14 may have a suitable inlet 26 to supply material to be screened to one end of the screen or deck. A suitable outlet 28 may be provided in the base at the other end for material that does not pass through the mesh. The deck or frame is disposed at an angle, to be explained hereinafter, such as shown in FIGURE 2, so that the material to be separated will move down the screening medium from the inlet to the outlet. A collecting hopper 29 may be disposed under the mesh in a conventional manner.

To vibrate the screen, rods 30 or the like may be connected directly at 32 to the screening medium 22 at spaced intervals. While the particular details of the mechanism 32 for connecting each rod to the screening medium is not, of itself, important to this invention, it should be known that resilient springlike distributor elements are disposed on opposite sides of the screening medium and each rod projects through a suitable aperture or hole in the medium and the spring distributors and is secured so that vibrations from the rods are transmitted to the screening medium through resilient disks or distributors and not directly. For the details of this, reference is made to U.S. Patent 2,880,871, issued April 7, 1959.

Each rod is vibrated vertically or at right angles to the general plane of the screening medium by an oscillating head 34 which is rigidly mounted or otherwise secured to the bridging member 14. The details of this oscillating or impeller head are not important to this invention, but it should be understood that these heads impart oscillatory vibrations to the rods and, therefore, to the screen, at a frequency of a high magnitude, for example 100 oscillations per second. Additionally, the heads are constructed so that superposed harmonics will be imposed on the screen to effect a screening action composed of a plurality of somewhat independent screening areas disposed around each rod. Very high frequency oscillations or vibrations emanate from the point of attachment of each rod to the screen or medium and radiate therefrom in concentric circles. The oscillations from each rod, thus radiated, intersect the radiating high frequency oscillations from the immediately adjacent rods in zones of interference where a high turbulence will be set up in the material. Again, reference is made to U.S. Patent 2,880,-871, issued April 7, 1959.

For any particular material to be saparated, the screen should be operated in a particular manner. For example, the material might be corn starch, calcium chloride, various abrasives, sands, chemical fertilizers, etc. Separation is desired according to a desired particle size. The factors' determining operation varies from one material to another, depending upon the particular characteristics of the material, its moisture content, granular characteristics and grain size, etc. Any particular material in any particular condition will have a certain pouring angle or angle of repose, which may be determined by taking any given amount of the material, prior to separation, and freely pouring it on a plane flat surface. The pile or build-up of the material, when poured freely, develops in an otherwise free manner only under the influence of gravity as effected by the inherent properties of the material itself.

For example, in FIGURE 4 a suitable container 36 is shown in the position of pouring any particular material on a plane surface 38 and it should be noted that the material falls in a free stream at 40 so that a pile 42 will build up according to the inherent properties of the material under the free fall of gravity.

In FIGURE 5 a suitable pile has developed and the angle that the side of the pile 42 makes with the horizontal is designated at R. This angle is what is referred to as the pouring angle or angle of repose.

For the most efficient separation for any particular material, the screen deck or screening medium 22 should be disposed at the angle of repose R. It should be noted in FIGURE 2 that the screen frame or deck has been indicated as inclined to the horizontal at the angle R.

In short, the angle of inclination of the screening medium or the plane of the screen deck to the horizontal should be precisely or approximately at the angle of repose of the pouring angle. Within the angle of repose area the effective opening in the screen may be varied slightly.

In FIGURES 6 and 7 an enlarged portion of the screen deck or screening medium has been shown, and it should be noted that the medium is made up of equally spaced lateral and longitudinal wires 44 and 46, respectively, which intersect and are in contact with each other at spaced predetermined points due to their interlacing or over and under arrangement. Thus the openings through the screening medium are rectangular and the material flow from the inlet 26 to the discharge 28 will be generally in the same direction as the wires 46 or in accordance with the arrow on FIGURE 6. FIGURE 7 is a side view of the portion of the screening medium or screen mesh shown in FIGURE 6 and this portion is shown as disposed at the angle of repose R. Since gravity draws the material through the openings in the screening medium, the size of the openings must be related to the separation desired. In a screening medium having both lateral and longitudinal wires, such as the type shown in FIGURES 6 and 7, the lateral spacing between the longitudinal wires 46 will not be affected by the angle of repose or inclination of the screen, and this spacing may be set directly in accordance with the desired separation. But the longitudinal spacing between the lateral wires 44 should be established in accordance with the angle of inclination. Since gravity may be assumed to be effective primarily in a perfectly vertical direction, the desired spacing between adjacent lateral wires 44 will be the projection of the actual spacing on a horizontal plane. For example, in FIGURES 6 and 7, the projected spacing of the wires 44 is indicated at X while the actual spacing is indicated at Y in FIGURE 7. Thus the effective or projected spacing X will be equal to the actual spacing Y times the cosine of the angle of inclination of the screening medium which, as indicated above, is or should be the angle of repose. Or the actual spacing Y will be equal to the desired or projected spacing X divided by the cosine of the angle of inclination and this is equal to the particle size separation desired divided by the cosine of the angle of repose.

As will be noted in FIGURE 6, the openings are rectangular, with the width of the rectangle being a fraction of the length. For example, it might be a 1–3 relationship. Or it might be any suitable relationship which defines a rectangle. When the screen is inclined, the width of the rectangle remains the same, but the effective length, meaning the dimension X, is reduced. And it should be understood that the screen may be originally constructed or woven so that in all operative positions the rectangular opening will project onto the horizontal still as a rectangle with its long dimension in the direction of material flow, although reduced somewhat in accordance with the function of the angle of repose.

The use, operation and function of my invention are as follows:

Any particular material to be screened or separated will have inherent characteristics which are peculiar to it. Such characteristics are based upon but not entirely dictated by its moisture condition, chemical make-up, electrostatic properties and the like. Any particular material, when freely poured into an otherwise unconstrained or unconfined pile, will assume a predetermined pile shape. The particular angle that the sides of such a pile will make with the horizontal will vary from one material to another and will also vary depending upon the moisture content of the particular material. But given any particular material in any particular condition, when freely poured, the resulting pile will form a predetermined angle with the horizontal and this may be referred to as the angle of repose or the pouring angle.

By the use of a screening structure of the type shown, a relatively coplanar screening medium or mesh may be made to vibrate through a predetermined amplitude at a predetermined frequency. The desired degree or size of separation may and probably will vary from one material to another, depending upon the particular use intended. But for any particular material, the screening mesh or medium should be chosen which will effect the desired separation. Due to the particular characteristics of any given material as acted upon by gravity when moving down an inclined screen deck that is vibrating, the highest efficiency of separation may be obtained by disposing the screening medium or deck as close to the angle of repose as possible. The freely falling particles will have less tendency to build up or pile since the supporting surface, the screen, is already disposed at the angle that the material tends to assume.

In a screening medium of the type having both lateral and longitudinal wires, the lateral spacing of the longitudinally disposed wires may be the same regardless of the angle at which the screen deck is disposed. But the longitudinal spacing of the laterally disposed wires must be varied in accordance with the angle of repose since the separation effected by two adjacent laterally disposed wires will be the horizontal projection of their spacing and not their actual spacing along the screen deck.

By using the principle set forth above, the maximum screening efficiency may be obtained with a minimum of adjustment. For any particular material, the angle of repose may be easily established. From this, and the particle size desired, the actual spacing Y of the laterally disposed wires may be accurately determined in accordance with the cosine of the angle of repose.

While the preferred form and several variations of the invention have been set forth or suggested hereinabove, it should be understood that numerous additional modifications, changes, alterations and substitutions may be made without departing from the fundamental theme of the invention. It is, therefore, wished that the invention be unrestricted, except as by the appended claims.

I claim:

1. A method of constructing and operating a screening device to separate a particular finely divided material according to a predetermined desired separation of particle size, the screening device having a screen deck with lateral and longitudinal wires uniformly spaced from each other, including the steps of determining the angle of repose of the particular material, positioning the screen deck approximately at the angle of repose relative to the horizontal, and spacing the lateral wires of the screen deck apart by a distance equal to the particle size separation desired divided by the cosine of the angle of repose.

2. The method of claim 1 further characterized by and including the steps of supplying the particular material to the upper surface of the screen deck at the top end, vibrating the screen and removing the thus separated material from the lower end of the screen deck.

3. The method of claim 1 further characterized in that the step of determining the angle of repose includes pouring the particular finely divided material freely in a pile on a generally flat surface, and measuring the angle that the side of the pile makes with the horizontal.

4. A method of determining the angular position of a vibratory screening device to separate a particular finely divided material according to a predetermined desired separation of particle size, the screening device having a screen deck, including the steps of determining the angle of repose of the particular material by pouring the material freely into a pile on a generally flat surface, and positioning the screen deck approximately at the angle of repose relative to the horizontal.

5. The method of claim 4 in which the screen deck includes uniformly spaced lateral and longitudinal wires, and including the step of spacing the lateral wires a distance approximately equal to the desired separation divided by the cosine of the angle of repose.

References Cited in the file of this patent

UNITED STATES PATENTS

| | | |
|---|---|---|
| 1,455,785 | Hackstaff | May 22, 1923 |
| 1,685,940 | Deister | Oct. 2, 1928 |
| 2,247,271 | Barlow | June 24, 1941 |
| 2,250,737 | Weber et al. | July 29, 1949 |
| 2,880,871 | Bruninghaus | Apr. 7, 1959 |

OTHER REFERENCES

Handbook of Mineral Dressing by Arthur F. Taggart, published by John Wiley and Sons, Inc., New York, 1945; sixth printing, March 1956.

Pages 1778 to 1784 of vol. 48, September 1954 issue of Industrial and Engineering Chemistry, article entitled "Screening Principles and Applications."

Principles of Chemical Engineering, Walker, Lewis, McAdams, and Gilliland, 1937, page 291, Grizzly, and page 293, Vibrating screens.